United States Patent [19]

Ito

[11] Patent Number: 4,585,148
[45] Date of Patent: Apr. 29, 1986

[54] PROCESS AND APPARATUS FOR METERING LIQUID COLORANT

[75] Inventor: Yoshito Ito, Yokohama, Japan

[73] Assignee: Nippon Paint Co., Ltd., Osaka, Japan

[21] Appl. No.: 575,846

[22] Filed: Feb. 1, 1984

[30] Foreign Application Priority Data

Feb. 5, 1983 [JP] Japan .................................. 58-16887

[51] Int. Cl.⁴ .............................................. B67B 7/00
[52] U.S. Cl. .................................... 222/77; 222/144.5;
222/166; 141/83; 141/104; 177/122
[58] Field of Search ................ 222/144, 55, 63, 144.5,
222/166, 164, 77, 14; 141/104, 100, 83, 129,
284, 283, 128; 177/52, 54, 60, 70; 414/411;
53/266 R; 177/122, 123

[56] References Cited

U.S. PATENT DOCUMENTS

| | | | |
|---|---|---|---|
| 2,094,702 | 10/1937 | Hexter | 222/144 |
| 2,257,238 | 9/1941 | Hexter | 222/166 X |
| 2,374,430 | 4/1945 | Hexter | 222/144.5 X |
| 2,423,969 | 7/1947 | Foltz | 222/144 X |
| 3,349,962 | 10/1967 | Levin | |
| 3,623,560 | 11/1971 | Stone | 222/55 X |
| 3,878,907 | 4/1975 | Morick | 141/100 X |
| 4,046,287 | 9/1977 | Hoekstra et al. | |
| 4,100,984 | 7/1978 | Klopfenstein et al. | 177/123 X |
| 4,314,653 | 2/1982 | Sindoni | |

FOREIGN PATENT DOCUMENTS

3007421 9/1981 Fed. Rep. of Germany .
53-100852 9/1978 Japan .

Primary Examiner—Joseph J. Rolla
Assistant Examiner—David H. Bollinger
Attorney, Agent, or Firm—Wenderoth, Lind & Ponack

[57] ABSTRACT

Process and apparatus for metering liquid colorant from a primary color reservoir having a valve for controlling the liquid flow into a collecting container. The process comprises the steps of disposing the valve into required position, operating a drive member to open and close the valve, permitting the liquid colorant to flow into the container, preparing three stages of successive metering controls, and automatically metering the liquid colorant through one or more stages. The apparatus comprises a plurality of reservoir bases, tilting device, operating member of the valve and balance for measuring the weight.

4 Claims, 20 Drawing Figures

PROCESS AND APPARATUS FOR METERING LIQUID COLORANT

BACKGROUND OF THE INVENTION

This invention relates to a process and an apparatus for metering liquid colorant or the like. In this specification, the term "liquid colorant" is used in its broadest sense to denote such materials as paint (including clear paint without containing pigment); primary color compound for preparation; liquid paint material such as varnish, dryer or additives; liquid-form dye and ink.

In U.S. Pat. No. 3,349,962 to Herbert C. Levin issued on Oct. 31, 1967, there is disclosed an automatic paint colorant dispensers employing a plurality of reciprocating pumps. Similar attempts have been made and disclosed in U.S. Pat. No. 4,046,287 to Joop F. Hoekstra issued on Sept. 6, 1977, Japanese Patent Public Disclosure No. 100852/78 (corresponding to U.S. Ser. No. 767921) issued on Sept. 2, 1978, German O.S. No. 3007421 to Dotzel Walter issued on Sept. 3, 1981, and U.S. Pat. No. 4,314,653 to Giuseppe Sindoni issued on Feb. 9, 1982.

Paint metering designs in the past often utilized fixed displacement pumps, so they are called "displacement types". In the designs, metering operation has been achieved through an extruding action of the fixed displacement pump. Such metering system of displacement type, however, does not readily lend itself to use for a small amount of paint such as 0.01-0.4 g by weight, resulting in an inconvenience of rather limited accuracy. Another problem is the fact that in order to deal with a plurality of colors and types of paints prior design requires a plurality of fixed displacement pumps corresponding to the number of colors or types of the paint, so that the metering device becomes complicated and color modification can not be easily attained.

SUMMARY OF THE INVENTION

It is an object of the present invention to provide a high-performance metering process and apparatus which make it possible to collect a small amount of liquid colorant with a considerable metering accuracy by incorporating a valve into a reservoir thereby permitting a drip of liquid colorant to drop through the action of opening and closing of the valve.

It is another object of the present invention to provide a convenient metering process and apparatus which make it possible to achieve automatic weight measuring of predetermined quantities of each liquid colorant as well as simple color-modification, utilizing a plurality of primary color reservoirs each containing a specific color or type of liquid colorant.

Other objects, features and advantages of the invention will become apparent from a reading of the specification, when taken in conjunction with the drawings, in which, like reference numerals refer to like elements in the several views.

BRIEF DESCRIPTION OF THE DRAWINGS

FIG. 3 is a sectional view illustrating a first metering control stage of the apparatus in FIG. 1.

DESCRIPTION OF THE PREFERRED EMBODIMENT

Figure 1:
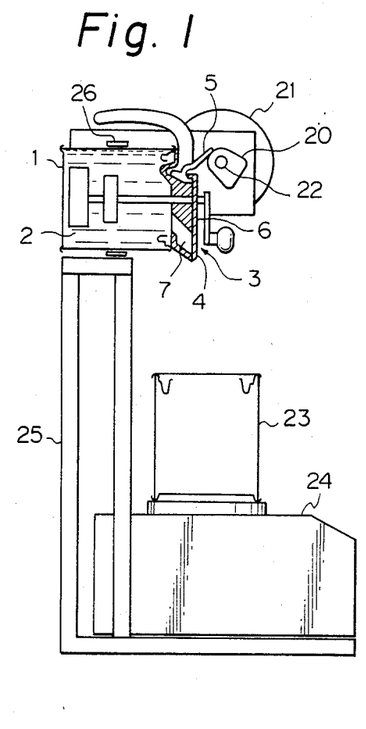
FIG. 1 is a side elevational view, partly in section, of a first embodiment of the apparatus according to the invention.
Figure 2:
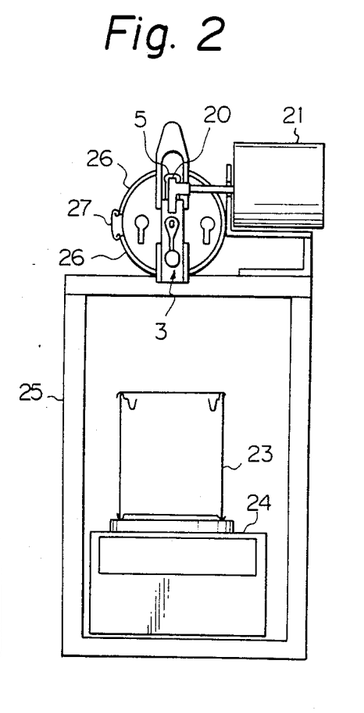
FIG. 2 is a front elevational view of FIG. 1.

Referring initially to FIGS. 1 and 2, there is shown a first embodiment of the invention liquid colorant metering apparatus. The apparatus includes a primary color reservoir 1 containing liquid colorant 2 to be metered, a valve 3 connected to the reservoir and provided with a slide valve member 4, and a valve operating rod 5 for translating the slide member 4 along a straight line parallel to the surface of a valve seat 6 thereby to open and close an outlet port 7.

Figure 3:
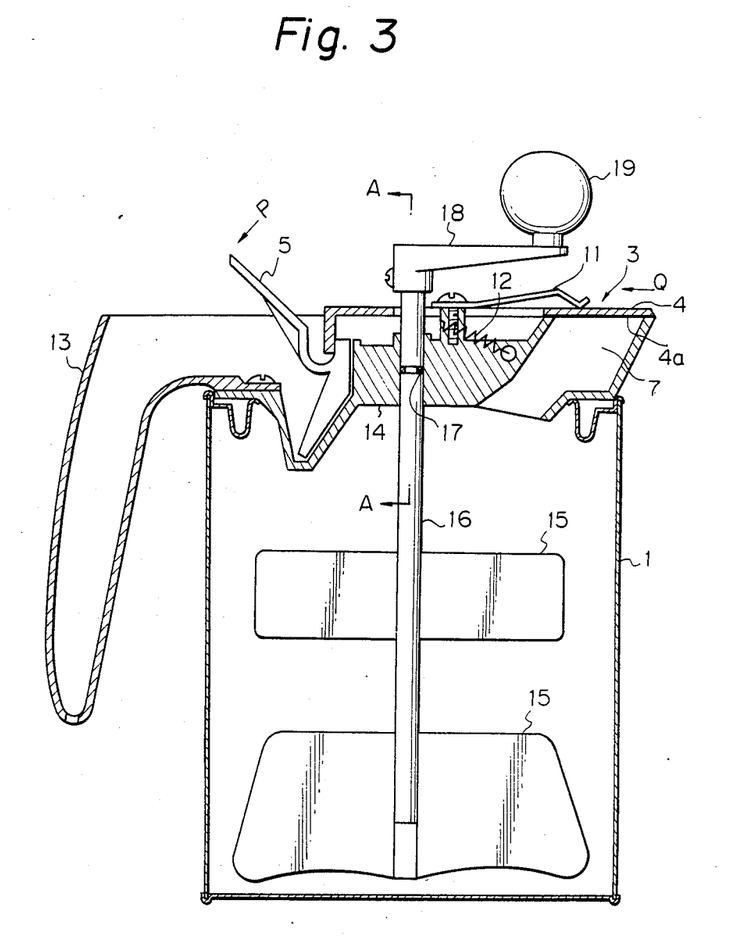
FIG. 3 is a vertical sectional view of a primary color reservoir accompanied with a valve.
Figure 4:
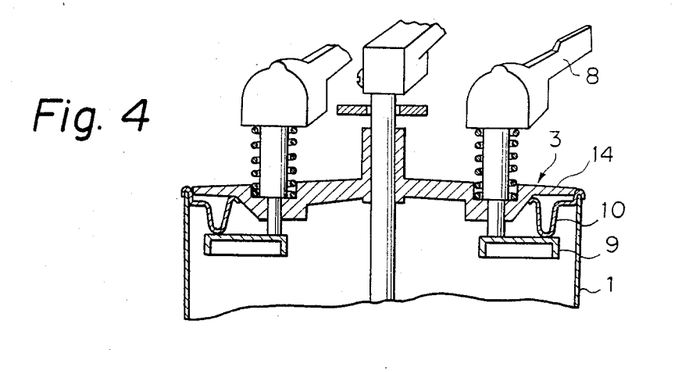
FIG. 4 is a sectional view taken along the line A—A of FIG. 3.

With the valve 3 as shown in FIGS. 3 and 4 in more detail, if the operating rod 5 is pushed in the direction of the arrow P, the slide member 4 moves along the arrow Q and the port 7 is opened. As shown in FIG. 4, the valve 3 can be assembled to the reservoir 1 by mounting it on the reservoir and then rotating the locking lever 8 so that a stop member 9 engages with a depression 10 of the reservoir.

In FIG. 3, the apparatus as shown includes a leaf spring 11 holding the valve member 4 downward, a return spring 12 arranged between a valve body 14 and the valve member 4 for putting back the member 4, a handle 13 assembled to the valve body 14 having the outlet port 7, agitating blades 15 for agitating the liquid colorant in the reservoir 1, a stem 16 for supporting the agitating blades 15, an o-ring 17, a lever 18 screwed onto the stem 16 and extending outside the reservoir, and a knob 19 for rotating the lever 18.

At the bottom side of the valve member 4, it is preferable to provide a resin coating 4a consisting of fluorine plastics so as to prevent dregs of liquid from sticking.

The resin coating 4a may be attached to the upper surface of the valve body 14.

In FIG. 1, the apparatus also includes a cam 20 for driving operation of the valve 3 by cooperating with the operating rod 5, a pulse motor (stepping motor) 21 rotatable in opposite directions for driving the cam 20, a motor shaft 22 for supporting the cam 20, a collecting container 23 for receiving liquid colorant from the reservoir 1, a balance 24 for measuring the weight of liquid colorant by putting the container 23 thereon, and a stand 25. Pulse motor 21 and balance 24 are connected to a controller (not shown), for example a kind of micro-computer such as a Model SBC-11/21 single board computer with a ROM module MRV11-C made by Digital Equipment Corp., which controls driving operation of the pulse motor 21 so as to perform automatic weight measuring of predetermined quantities of liquid colorant.

In FIGS. 1 and 2, reservoir 1 and valve 3 are mounted in a sideways position with an openable clamp 26 and a fastener 27. A half piece of the clamp 26 is secured to the stand 25 and another half piece is movably attached around the reservoir. Thus, reservoir 1 and valve 3 can be positioned either in the upright position of FIG. 3 or in the sideways position of FIG. 1.

The operation of the first embodiment of the metering apparatus described hereinbefore is as follows. By way of example, in the following case liquid colorant is paint and the objective weight for metering is 100 g.

Figure 5:
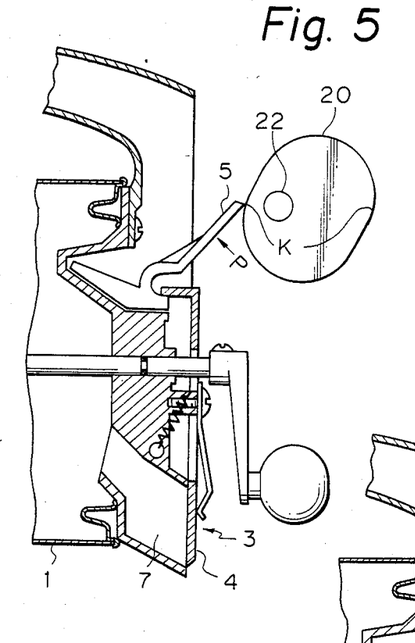
FIG. 5 is a sectional view illustrating the zero-point adjustment mechanism of the apparatus shown in FIG. 1.

In the first place, the pulse motor 21 is put in motion by receiving an electrical signal from the controller thereby permitting the starting portion of the cam surface K to engage with the operating rod 5 (FIG. 5). Then, the slide member 4 is slightly moved upward by the motion of the rod 5 toward the direction P, and a drop of liquid colorant flows out of the port 7. In this moment zero point adjustment has been completed.

In the next place, zero point adjustment is succeeded by a first metering control stage in which the degree of opening of the valve 3 will be reduced stepwise.

Figure 6:
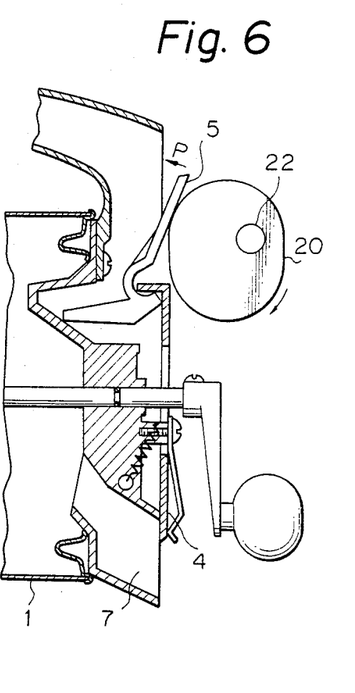

In FIG. 6, the cam 20 is rotated about the shaft 22 in the clockwise direction by a signal from the controller thereby pushing the rod 5 in the direction P, whereby the slide member 4 reaches the full open position. In the next place, the cam 20 is rotated about the shaft in the counterclockwise direction gradually by a signal from the controller so that the slide member 4 moves downward stepwise. Thus, the degree of opening of the port 7 is reduced stepwise.

In the first metering control stage, interrelations between the presently collected weight and the degree of opening of the valve 3 are as follows.

| collected weight (g) | degree of opening |
| --- | --- |
| 40 and over | full open |
| 20–39 | ½ |
| 10–19 | ¼ |
| 5–9 | ⅛ |
| 2.5–4.9 | 1/16 |

During the first metering control stage, all of the liquid colorant flowing out of the port 7 is collected into the container 23 located therebelow. When the balance 24 indicates the weight of 97.5 g, the first metering control stage is succeeded by a second metering control stage in which the degree of opening of the valve 3 will be adjusted little by little.

In the second metering control stage, the controller detects the indication of the balance 24 and adjusts the position of the cam 20 so as to move the slide member 4 in the direction Q or R (FIG. 7), thereby permitting an increment per second, for example 0.02–0.05 g per 0.1 second, of liquid to flow out. Thus, a weight from 0.4 to 2.5 g is metered. When the balance 24 indicates the weight of 99.6 g, the second metering control stage is succeeded by a third metering control stage in which the port 7 of the valve 3 will be intermittently closed so that liquid colorant will drop.

Figures 7, 8:
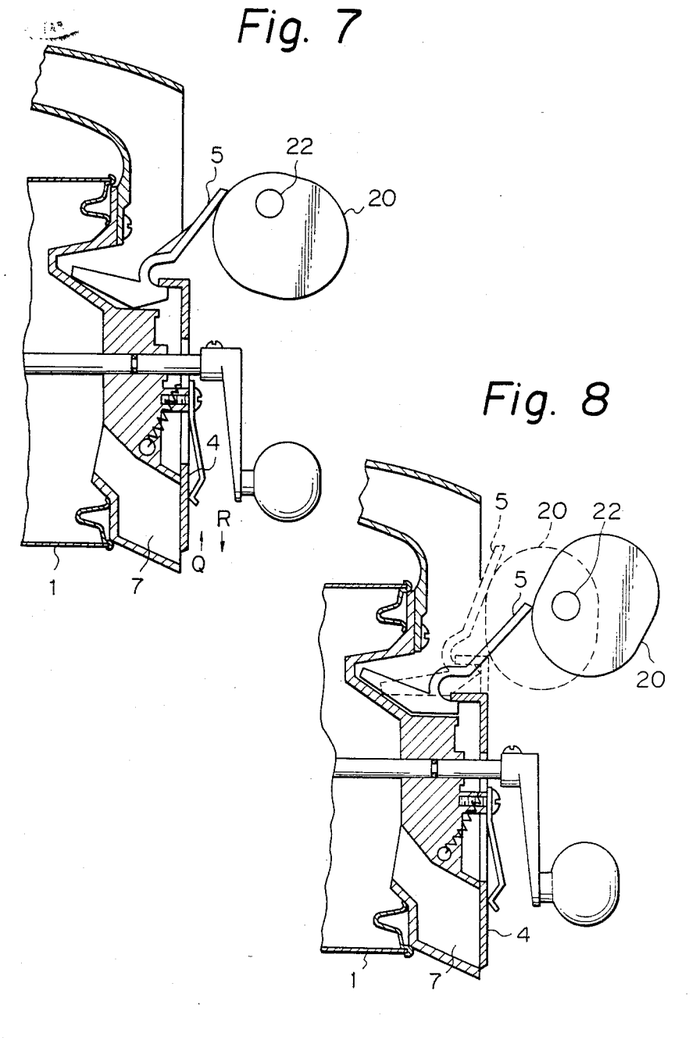
FIG. 7 is a sectional view illustrating a second metering control stage of the apparatus in FIG. 1.
FIG. 8 is a sectional view illustrating a third metering control stage of the apparatus in FIG. 1.

In this case, during the third metering control stage the remainder 0.4 g or below will be metered and collected. In FIG. 8, the cam 20 is rotated about the shaft 22 in the clockwise direction and counterclockwise direction only a small amount by a signal from the controller, whereby the slide member 4 reciprocates up and down and intermittently closes the port 7. During the intermittent closing operation liquid colorant drops.

In this third metering control stage, interrelations among the presently collected weight, the number of closing cycle and the drop condition are as follows.

| collected weight (g) | number of closing cycle | drop condition (number of drop) |
| --- | --- | --- |
| 0.2–0.4 | 1 | 1 |
| 0.1–0.2 | 2 | 1 |
| 0.01–0.1 | 3–4 | 1 |

Accordingly, after the third metering control stage, the balance 24 indicates the weight of 100 g.

If the collected weight is more than 2.5 g, the first, second and third metering control stages should be passed through in succession to meter the objective weight. If the collecting weight is between 0.4 and 2.5 g, the second and third metering control stages should be passed through. If the collecting weight is less than 0.4 g, only the third metering control stage should be used. Therefore, each stage should be selected depending upon the objective weight.

With respect to the problem as to which stage should be used, an example is given hereinafter. According to the color sample (Munsell value; 10GY6.5/6), colors of yellow, white, cyanin blue and black are defined as base materials. The results of the use of each stage depending upon the collected weight are as follows.

| base material | collecting weight | utilized stage |
| --- | --- | --- |
| yellow | 60.6 g | first, second, third |
| white | 36.9 g | first second, third |
| cyanin blue | 2.2 g | second, third |
| black | 0.3 g | third |

Thus, according to the invention, the most appropriate stages are selected to be utilized in achieving automatic weight measuring of predetermined quantities of liquid colorant, so that a high-performance metering process is obtained with a considerable metering accuracy.

As a matter of course, it should be noted that the aforementioned interrelations between the collected weight and the degree of opening of the valve, or between the collected weight and the number of closing cycles vary depending upon the area of the opening of the valve.

Referring now to FIGS. 9–14, there is shown a second embodiment of the liquid colorant metering apparatus of the invention.

Figure 9:
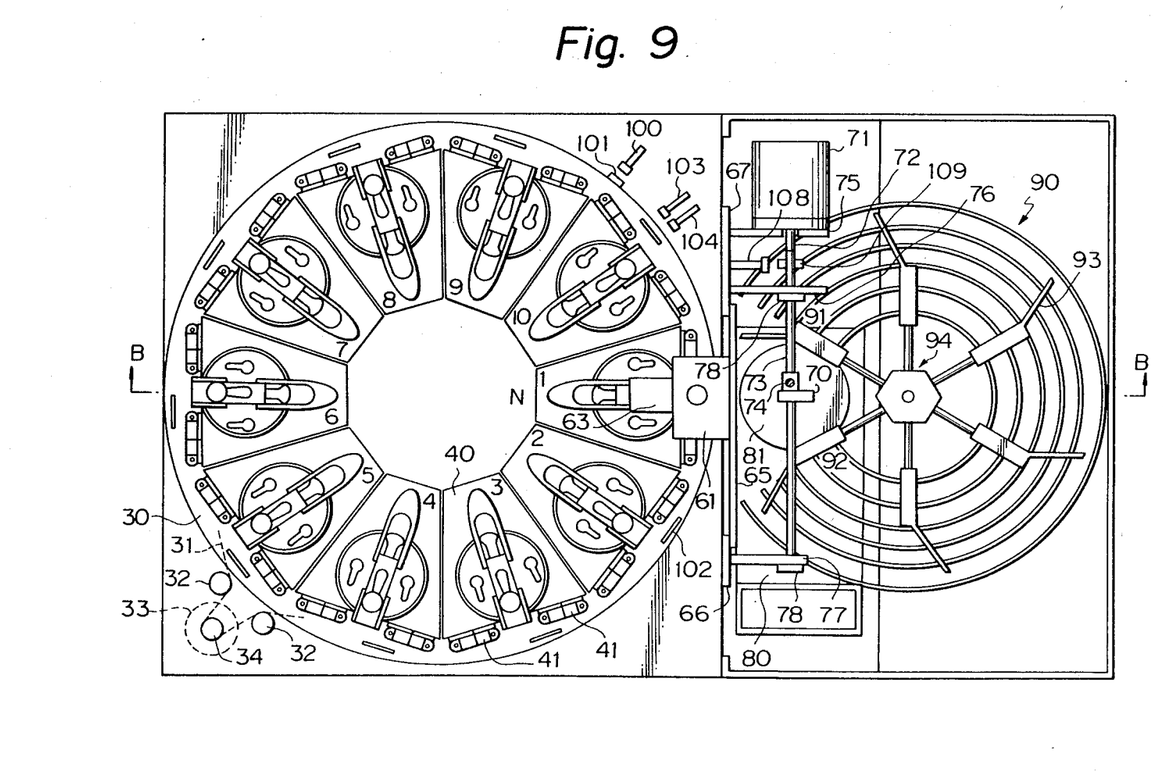
FIG. 9 is a plan view of a second embodiment of the invention.
Figure 10:
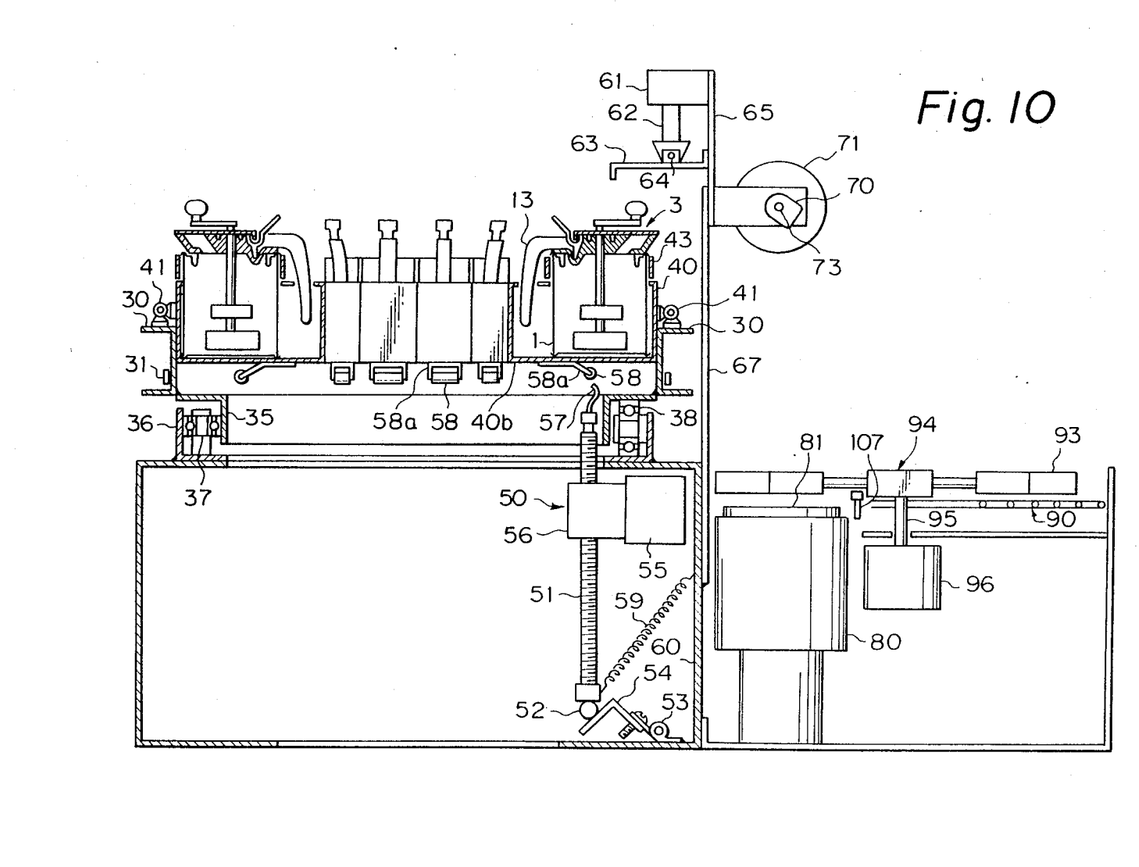
FIG. 10 is a sectional view taken along the line B—B of FIG. 9.

In FIGS. 9 and 10, the numeral 30 designates a pulley or rotary table having a channel section, and a sprocket chain 31 is wound along the periphery of the pulley 30. The chain 31 extends along sprocket wheels 32 and engages with a driving sprocket wheel 34, which is driven by a motor 33 rotatable in opposite directions. To the bottom side of the pulley 30 an angle support 35 is secured, and between the angle support 35 and oppositely located angle base 36 bearing 37, 38 are disposed. One of the bearings 37, 38 is located in horizontal fashion, and the other is located in vertical fashion in order to support horizontal force and vertical forces. Thus, when the motor 33 is put in motion the pulley 30 begins to rotate through the chain 31.

Figures 12, 13:
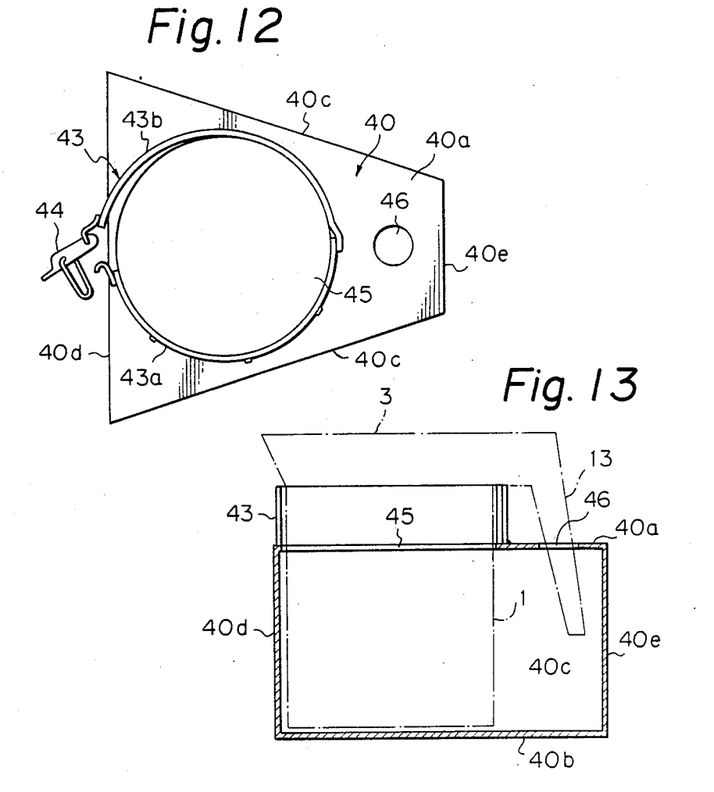
FIG. 12 is a plan view illustrating the reservoir base with a clamp.
FIG. 13 is a vertical sectional view of FIG. 12.

Inside the pulley 30, as shown in FIG. 9, ten reservoir bases 40 are arranged in peripheral fashion, and each reservoir base 40 is attached to the pulley 30 by way of hinge 41 for tilting use (FIG. 10). As shown in FIGS. 12 and 13, the reservoir base 40 comprises top plate 40a, bottom plate 40b, side plates 40c, front plate 40d and rear plate 40e forming a box shape together. The top plate 40a is provided with openings 45, 46 for respectively receiving a primary color reservoir 1 and a handle 13 (FIG. 3). Disposed around the opening 45 of the top plate 40a is a clamp 43 which comprises a rigid band portion 43a and a movable band portion 43b. In order to assemble the two band portions a clamp fastener 44 is provided. In FIG. 13, when a reservoir 1 with valve 3 is inserted in the openings 45, 46, the clamp 43 can hold the reservoir in position on the reservoir base 40.

Since primary color reservoir 1 and valve 3 are connected into a unitary component, as shown in FIG. 3, an operator can easily clamp the component on the base 40 in detachable fashion, through the steps of inserting the reservoir with the valve thereon into the openings 45, 46 and locking the clamp 43 with the fastener 44. Therefore, even if a plurality of colors or kinds of liquid colorant are prepared for the reservoirs 1, color modifying operation by exchanging a reservoir for another one is easily achieved within a few seconds.

In FIG. 10, the numeral 50 designates a tilting device for reservoir base 40. The device 50 comprises a threaded rod 51 movable up and down, a round tip 52 attached to the lower end of the rod 51, an angle plate 54 attached to a base frame 60 by a hinge 53 for supporting the round tip 52, and a threaded device 56 engaging with the rod 51 for lifting the rod 51 up and down by a motor 55 rotatable in opposite directions. Attached to the upper end of the rod 51 is a hook 57, and under the bottom plate 40b of the base 40 fitting rollers 58 are rotatably mounted by roller supports 58a so that the fitting rollers 58 engage with the hook 57. The numeral 59 designates a coil spring interconnecting the lower end of the rod 51 and the base frame 60.

When the motor 55 starts, the rod 51 moves upward and then the hook 57 engages with the fitting roller 58. As the rod 51 moves upward, the reservoir base 40 gradually tilts about the hinge 41 together with the reservoir 1 and the valve 3.

During the upward movement of the rod 51, the spring 59 draws the lower end of the rod 51 thereby permitting the round tip 52 to ascend along the surface of the plate 54, whereby the assembly of the hook 57 and roller 58 moves upward with a circular movement.

The spring 59 acts the same during the downward movement of the rod 51.

In FIGS. 9 and 10, the numeral 61 designates an electromagnet located above the tilting position N, and the numeral 62 designates a core movable up and down. Attached to the core 62 by a pivot 64 is a stop plate 63, which is slidably supported on a crosspiece 65 supporting the electromagnet 61 thereon. The crosspiece 65 extends between vertical plates 66 and 67 and is secured thereto.

In FIGS. 9 and 10, the numeral 70 designates a cam as an activating member for opening and closing the valve 3 assembled to the primary color reservoir 1. The cam 70 is fixed on a shaft 73 coaxial with a motor shaft 72 by a screw 74 so that it is put in alignment with the tilting position N. Pulse motor 71 is of the same type as the motor 21 in FIG. 1 rotatable in opposite directions and is mounted on a mounting plate 75 secured to the vertical plate 67. Spaced from the plate 75 a second mounting plate 76 is secured to the vertical plate 67, and spaced from the plate 76 a third mounting plate 77 is secured to the vertical plate 66. Between the mounting plates 76 and 77 the shaft 73 extends and each mounting plate is provided with a bearing 78.

Figure 14:
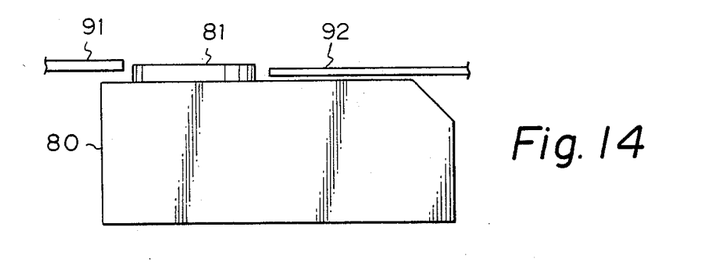
FIG. 14 is a side elevational view illustrating two edges of a grating located adjacent a balance.

Located under the cam 70 is an electronic balance 80, and a grating 90 consisting of six circular wires each forming an arc larger than semicircle is disposed around a balance table 81 of the balance 80 (FIG. 9). In FIG. 14, the surface of the forward edge 91 of the grating 90 is at a high level relative to the surface of the balance table 81, and the surface of the rear edge 92 of the grating 90 is at a low level relative to the same. Disposed directly above the grating 90 is a collecting container transfer device 94, which includes six sweepers 93 each connected to a motor shaft 95. The sweepers 93 are driven by a motor 96 so as to transfer the containers lying on the grating 90 to the balance table 81 by their sweeping action.

Pulley driving motor 33, tilting device 50, pulse motor 71, electronic balance 80 and container transfer device 94 are connected to the controller (not shown), which not only measures the weight of liquid colorant through the balance 80, but also controls driving conditions of the motor 33, tilting device 50, motor 70 and transfer device 94.

The operation of the second embodiment of the invention metering apparatus is as follows.

The primary color reservoirs 1 with valve 3 containing a plurality of colors or kinds of liquid colorant are inserted into the reservoir bases 40, respectively, as shown in FIG. 13, and are fixed in position by the clamps 43 into a circumferential disposition, as shown in FIG. 9.

When a sensor 100 (FIG. 9) detects a sensor unit 101 attached to the pulley 30 by coming into alignment with the position, a reference point of the ten reservoir bases 40 is determined. Circumferential position of each reservoir base 40, for example base No. 1 to No. 10, is recorded by the controller with the reference point as a center, so that the controller can distinguish the content of each reservoir, such as No. 1: red, No. 2: blue and No. 3: yellow. The order of the reservoir 1 is predetermined by a program of the controller so as to be supplied into the position and to be metered in order.

If the required reservoir is on the base No. 3, motor 33 is driven by a signal from the controller so as to rotate the pulley 30 in the counterclockwise direction, whereby the reservoir with its valve on the base No. 3 moves toward the tilting position N. Disposed on the pulley 30 are ten sensor units 102 corresponding to the circumferential dispositions of the reservoir bases 40. Alignment of the base No. 3 with the tilting position N is detected by the alignment between the corresponding sensor unit 102 (in this case the unit 102 located adjacent the base No. 2) and sensors 103, 104. If the required reservoir is on the base No. 9, the pulley 30 is rotated in the clockwise direction, whereby the base No. 9 moves toward the tilting position N.

Figure 11:
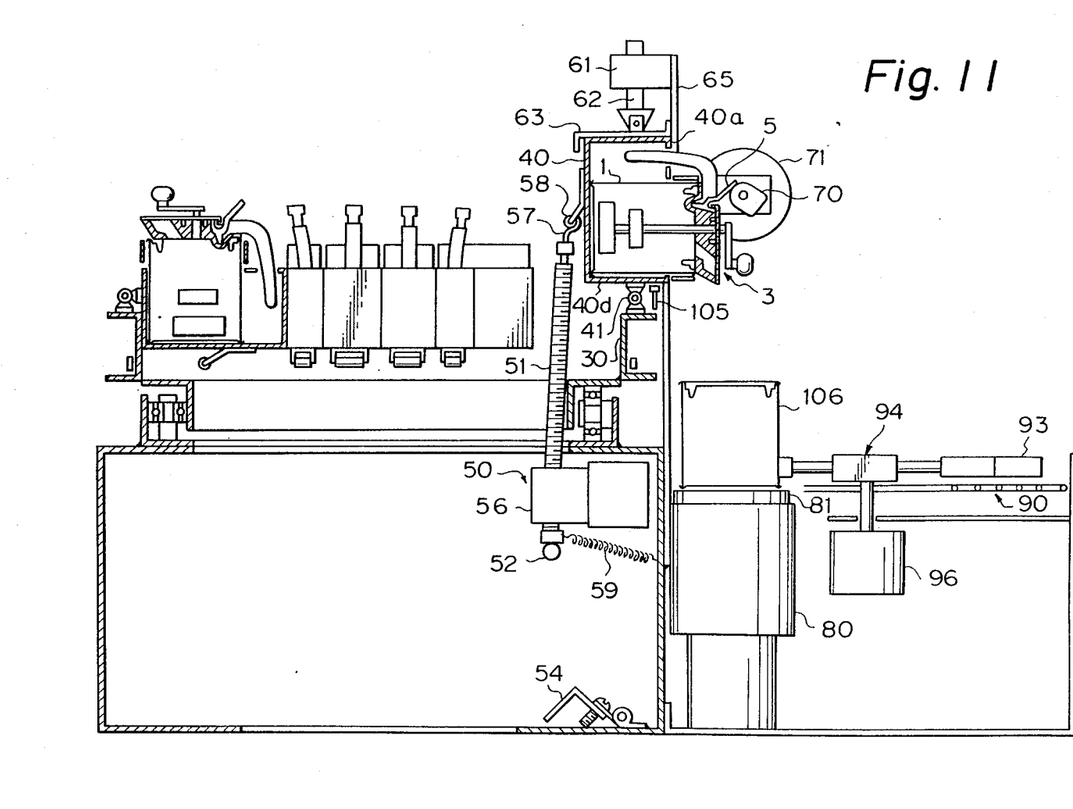
FIG. 11 is a sectional view illustrating a position of the primary color reservoir with a valve supported on a reservoir base.

Electromagnet 61 is energized by a signal from the controller thereby permitting the core 62 to move upward, and the stop plate 63 follows. Then, tilting device 50 is energized thereby permitting the rod 51 to move upward, and the hook 57 engages with the roller 58 attached to the bottom plate 40b of the base No. 3 on the tilting position N. As the rod 51 moves upward the base No. 3 rotates about the pivot 41. With this rotation an edge of the top plate 40a of the base 40 is moved into abutment with the crosspiece 65, and this abutment is detected by a sensor 105 (FIG. 11). Then, the stop plate 63 moves downward by a signal from the controller so as to settle the reservoir with valve supported on the base No. 3 into the sideways position (FIG. 11). In this position, the operating rod 5 is brought into contact with the cam 70.

Motor 96 is energized by a signal from the controller and a collecting container 106 on the grating 90 is put on the balance table 81 of the balance 80. A sensor 107 (FIG. 10) detects this condition and the pulse motor 71 is energized by a signal from the controller. The pulse motor 71 achieves zero point adjustment by a sensor 108 and a sensor unit 109 through the process of bringing a starting portion of the cam surface of the cam 70 into contact with the operating rod 5 thereby permitting the slide member 4 to move slightly and allowing a single drip of the liquid colorant to drop out of the port 7 of the valve 3.

With the parts in the position of FIG. 11, the automatic liquid colorant metering process is carried out with colorant being fed from the side facing reservoir 1 to the collecting container 106 through one or more metering control stages selected from first, second and third metering control stages in the same manner as described in relation to FIGS. 6, 7 and 8. It is also operative to select a required stage depending upon the objective weight.

In FIG. 11, after finishing of the metering process from the side facing reservoir, electromagnet 61 is energized by a signal from the controller thereby permitting the stop plate 63 to move upward to release the lock holding the reservoir in the sideways position. Then, tilting device 50 is energized by a signal from the controller thereby permitting the rod 51 to move downward keeping the engagement between the hook 57 and the roller 58. Following this operation the side facing reservoir base 40 having a reservoir with a valve is rotated about the pivot 41 toward the normal position of FIG. 10, and it returns to the normal position when the front plate 40d comes into contact with the wall of the pulley 30. At this moment the engagement between the hook 57 and the roller 58 is released, and the electromagnet 61 is de-energized by a signal from the controller thereby permitting the stop plate 63 to move downward. Next the transferring operation of the reservoir to be metered next into the tilting position N by the motor 33 is carried out in accordance with the program of the controller as described hereinbefore.

As a third embodiment of the invention, a plurality of metering apparatuses of FIG. 1 may be arranged side by side so that a balance 24 travels along a slide rail disposed parallel to the row of the metering apparatus. In this case, the balance 24 travels along a slide rail carrying a collecting container 23 thereon in accordance with a program of a controller, and it stops in turn for metering operation at the predetermined positions corresponding to each valve 3 of the metering apparatus. The metering process is caused to proceed through one or more stages selected from the three metering control stages depending upon the objective weight for metering in the same manner as described hereinbefore.

Figure 15:
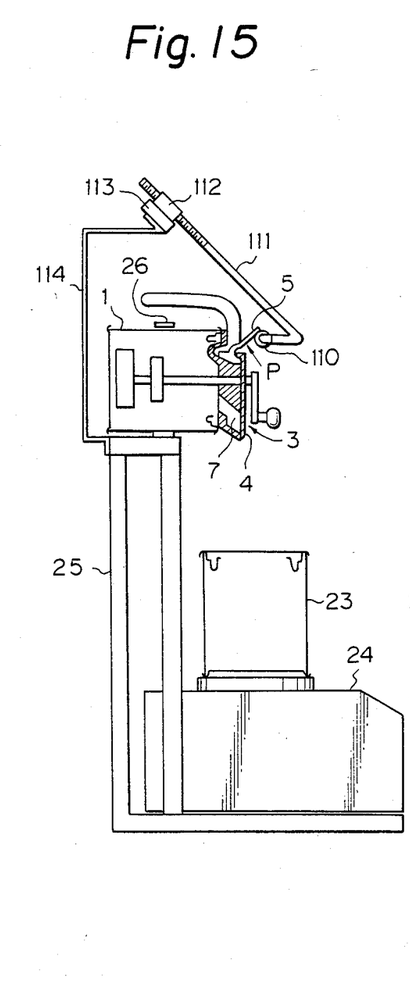
FIG. 15 is a side elevational view, partly in section, of a modified form of an operating member.
Figure 16:
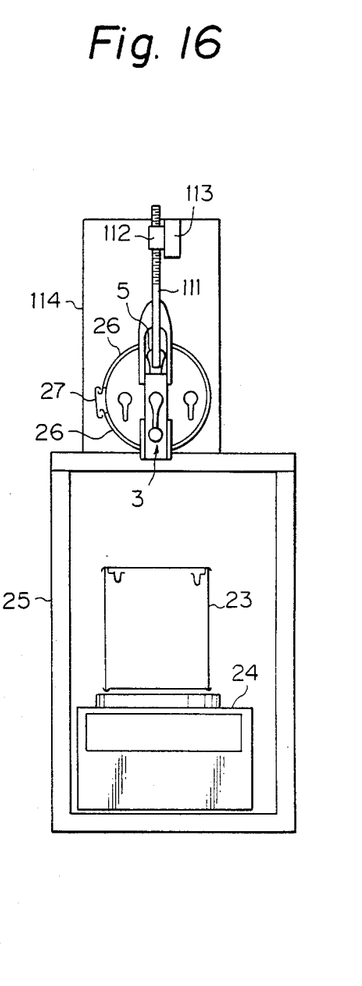
FIG. 16 is a front elevational view of FIG. 15.

Referring now to FIGS. 15 and 16, there is shown an alternative driving member which can be substituted for cam 20 or 70 to open and close the valve 3 through the contact with the operating rod 5. In FIGS. 15 and 16, the apparatus includes a roll bearing 110 for engagement with the rod 5 of the valve 3, a threaded rod 111 extending upward on a slant through the L-shaped corner from the supporting portion of the roll bearing 110, a screw device 112 secured on the rod 111 for translating the rod 111 back and forth by a pulse motor 113 rotatable in opposite directions, and an extension bar 114 secured to the stand 25 and extending upward for supporting the pulse motor 113. Rotation of the pulse motor 113 is transformed into rectilinear motion of the rod 111 by the screw device 112, and this rectilinear motion of the rod 111 causes the operating rod 5 of the valve 3 to move in the direction P through the roll bearing 110, thereby lifting the slide member 4 to open the valve 3.

Figure 17:
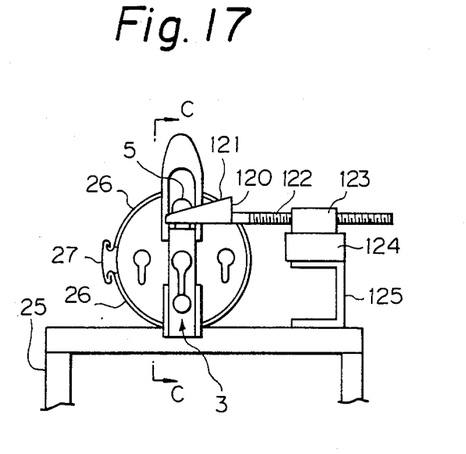
FIG. 17 is a front elevational view of an alternate modified form of the operating member.
Figure 18:
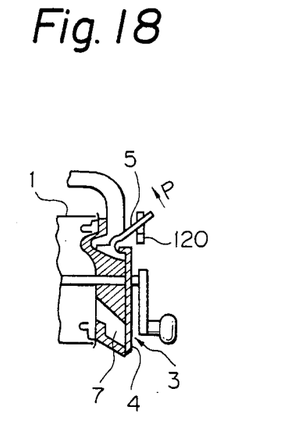
FIG. 18 is a sectional view taken along the line C—C of FIG. 17.

Referring to FIGS. 17 and 18, there is shown a further alternate driving member to open and close the valve 3 through the contact with the operating rod 5. In FIGS. 17 and 18, the apparatus includes a cam 120 having a sloping face 121 for engagement with the operating rod 5 of the valve 3, a threaded rod 122 connected to the cam 120, a screw device 123 screwed on the rod 122 for translating the rod 122 horizontally back and forth by a pulse motor 124 rotatable in opposite direction, and an extension bar 125 secured to the stand 25 for supporting the pulse motor 124. Rotation of the pulse motor 124 is transformed into rectilinear motion of the rod 122 by the screw device 123, and this rectilinear motion of the rod 122 causes the face 121 of the cam 120 to engage with the operating rod 5 of the valve 3, thereby moving the rod 5 in the direction P along the face 121 of the cam 120, whereby the slide member 4 is lifted to open the valve 3.

Figure 19:
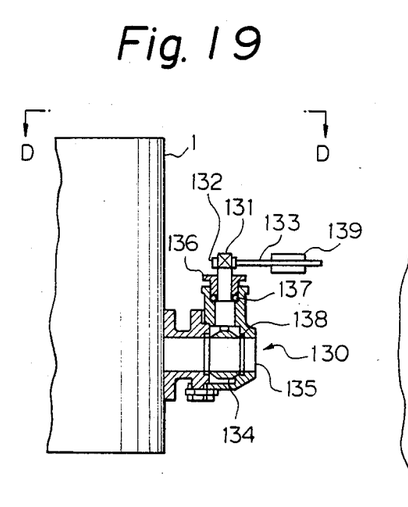
FIG. 19 is a side elevational view, partly in section, of a normal reservoir with ball valve and its operating member.
Figure 20:
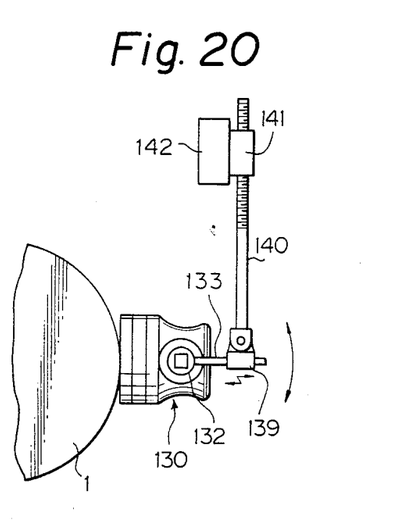
FIG. 20 is a plan view taken in the direction D—D of FIG. 19.

Referring to FIGS. 19 and 20, there is shown an alternate valve mechanism including a ball valve 130 attached to a primary color reservoir 1, and operating system for the ball valve 130. In FIG. 19, the ball valve 130 is provided with a valve stem 131, and a nut 132 is fixed around the square tip portion of the stem 131. Secured to the nut 132 is an operating lever 133, which can be moved right and left to rotate the stem 131. When the stem 131 is rotated, a ball 134 connected to the stem 131 is rotated to open and close an outlet 135 of the valve 130. The valve system further includes a packing gland 136, a packing 137, and seat rings 138.

In FIGS. 19 and 20, the operating lever 133 is provided with a sleeve 139 slidably fitted thereon, and a threaded rod 140 is pivotally mounted to the sleeve 139. The numeral 141 designates a screw device screwed on the rod 140 for translating the rod 140 horizontally back and forth by a pulse motor 142 rotatable in opposite directions. Rotation of the pulse motor 142 is transformed into rectilinear motion of the rod 140 by the screw device 141, and this rectilinear motion of the rod 140 causes the lever 133 to move right and left with the sleeve 139 sliding on the lever 133, whereby the stem 131 is rotated to open and close the ball valve 130.

One of the components of the process according to the present invention is a step of disposing the valve attached to the reservoir into a position adapted to engage with the drive member for the valve. It should be noted that this step is performed in the following several ways.

In FIG. 1, the operating rod 5 of the valve 3 attached to the primary color reservoir 1 is kept in contact with the cam 20.

In FIGS. 10 and 11, the normal position reservoir 1 is put into sideways position thereby permitting the operating rod 5 of the valve 3 to come into contact with the cam 70.

In FIGS. 15 and 16, the operating rod 5 of the valve 3 attached to the side facing reservoir 1 engages with the roll bearing 110.

In FIGS. 17 and 18, the operating rod 5 of the valve 3 attached to the side facing reservoir 1 engages with the face 121 of the cam 120.

In FIGS. 19 and 20, the sleeve 139 slidably fits on the operating lever 133 connected to the stem 131 of the ball valve 130 which is attached to the normal reservoir 1.

After the tilting down movement of the normal reservoir a drive member moves into contact with an operating rod of the valve, or A drive member moves into contact with an operating rod of the valve attached to the normal reservoir.

It should also be noted that the term "valve attached to the reservoir" is herein used to denote not only the valve directly connected to the primary color reservoir as shown in FIGS. 3 and 4, but also the valve 130 connected to the reservoir 1 by way of an interconnecting member such as a pipe as shown in FIG. 19.

Futhermore, it should also be noted that the term "drive member" is herein used to denote the following means.

cam 20 or 70 which rotates and gives swinging movement to the operating rod 5 of the valve 3 thereby to open and close the valve 3 roll bearing 110 which moves in reciprocating rectilinear motion and gives swinging movement to the operating rod 5 of the valve 3 thereby to open and close the valve 3 face 121 of the cam 120 which moves in reciprocating rectilinear motion and gives swinging movement to the operating rod 5 of the valve 3 thereby to open and close the valve 3 sleeve 139 which slidably fits on the operating lever 133 of the ball valve 130 and moves in reciprocating rectilinear motion thereby to open and close the outlet port of the ball valve 130 means adapted to a type of selected valve to engage with an operating member of the valve thereby to open and close the valve In the aforementioned embodiments of the invention, the valve attached to the primary color reservoir consists of a slide member type or a ball member type. However, the valve is not limited to the types as shown and any type of valve can be used as far as it includes an operating member to be driven by a drive member for opening and closing of the valve. The primary color reservoir may be held in an inclined position rather than said sideways position.

Thus, as is apparent from the above description, the metering apparatus of the present invention is extremely well suited for use to collect a small amount of liquid colorant with a considerable metering accuracy, since it comprises the steps of disposing the valve attached to the reservoir into engagement with a drive member, operating said drive member to open and close the valve, collecting liquid colorant flowing out of the reservoir in a container positioned on a balance, preparing first, second and third metering control stages, and automatically metering the liquid colorant through one or more control stages.

Furthermore, the metering apparatus of the present invention has an advantage that color modifying operation can be easily achieved, since a plurality of primary color reservoirs are circumferentially disposed to be movable in a circumferential direction, and the reservoir is tilted when a collecting container reaches a collecting position on a balance, whereby required quantities of liquid colorant are automatically metered, while the reservoir with valve is removably attached to the circumferentially disposed reservoir bases.

I claim:

1. A process for metering liquid colorant from a primary color reservoir containing liquid colorant therein, said reservoir having a valve thereon for controlling the flow of the liquid colorant out of the reservoir, said process comprising the steps of:

moving the reservoir into a position in which liquid colorant will flow from said valve when said valve is opened and in which said valve engages with a valve drive member;

placing a collecting container on an electronic balance under the valve in said position and collecting the liquid colorant flowing out of the reservoir;

providing first, second and third stages of metering control of said valve, said first metering control stage consisting of reducing the degree of opening of the valve in a stepwise fashion, the second metering control stage consisting of adjusting the degree of opening of the valve for obtaining a predetermined increment of liquid flow, and said third metering control stage consisting of intermittently closing and opening the valve for producing successive drops of liquid colorant; and when a very small amount of colorant is to be collected, operating said valve drive member for carrying out only the third metering control stage, and when a slightly larger amount of colorant is to be collected, operating said valve drive member for carrying out the second and third metering control stages in succession, and when a large amount of colorant is to be collected, operating said valve drive member for carrying out the first, second and third metering control stages in succession.

2. A process as claimed in claim 1 further comprising providing a plurality of said primary color reservoirs in upright positions around a closed geometric figure, moving them in the circumferential direction of said figure until a desired reservoir is moved into a position opposed to said valve drive member, and said step of moving the reservoir into a position in which liquid colorant will flow from said valve comprises tilting the reservoir from the upright to the horizontal position.

3. An apparatus for metering liquid colorant into a collecting container, comprising:

a rotary table rotatable in a horizontal plane;

a plurality of reservoir bases mounted around the circumference of said rotary table and pivotally mounted on said table for pivotal movement from a horizontal to a vertical position;

a plurality of primary color reservoirs removably mounted on the respective bases in an upright position, each reservoir having an open top and a valve mechanism for controlling the flow of liquid colorant removably mounted on the open top for closing the top;

a tilting device at a position around the table for pivoting a reservoir base which is at a position opposite said tilting device so as to tilt the reservoir on said base from the upright to a horizontal position;

a valve drive member at a position corresponding to the position of said tilting device and engaged by said valve means when the reservoir is tilted;

a pulse motor connected to said valve drive member for driving said valve drive member for moving said valve mechanism in an opening and a closing direction;

an electronic balance located under said valve drive member for supporting a collecting container thereon to receive colorant from the valve mechanism of a tilted reservoir; and means to which the output from said electronic balance is connected and having an output connected to said pulse motor for driving said pulse motor to drive said valve drive member to move said valve mechanism in first, second and third stages of metering control at least partly in response to the weight of the colorant collected in the collecting container, said first metering control stage consisting of reducing the degree of opening of said valve mechanism in a stepwise fashion, the second metering control stage consisting of adjusting the degree of opening of the valve mechanism for obtaining a predetermined increment of liquid flow, and the third metering control stage consisting of intermittently closing and opening the valve mechanism for producing successive drops of liquid colorant.

4. An apparatus as claimed in claim 3 further comprising a circular arc grating for supporting collecting containers thereon to be supplied to said balance, said grating having one end adjacent one side of said electronic balance and at a level above the level of the balance, and having the other end adjacent the other side of the electronic balance and at a level below the level of the balance, and means for sliding collecting containers along said grating and onto and off said electronic balance.

* * * * *